UNITED STATES PATENT OFFICE.

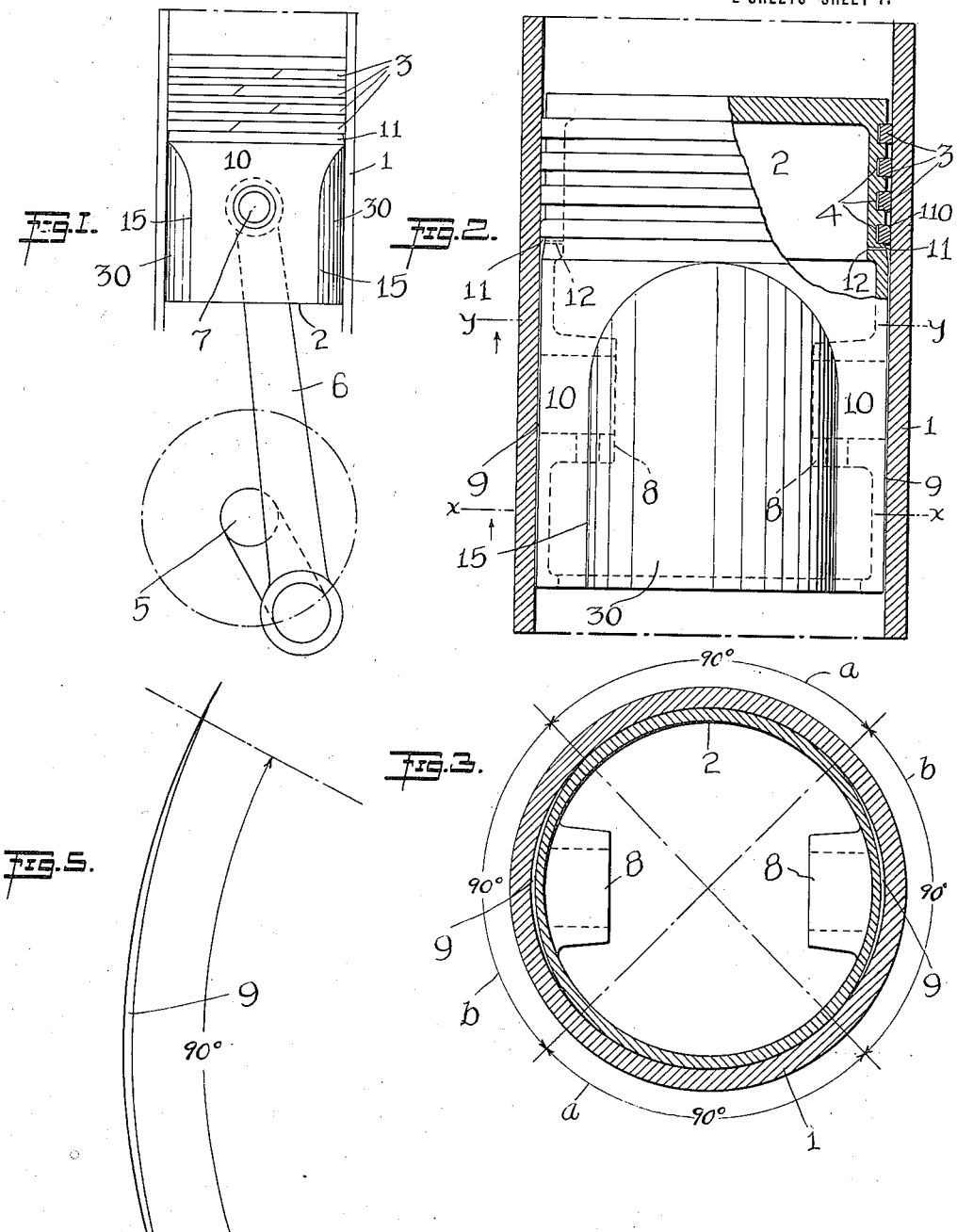

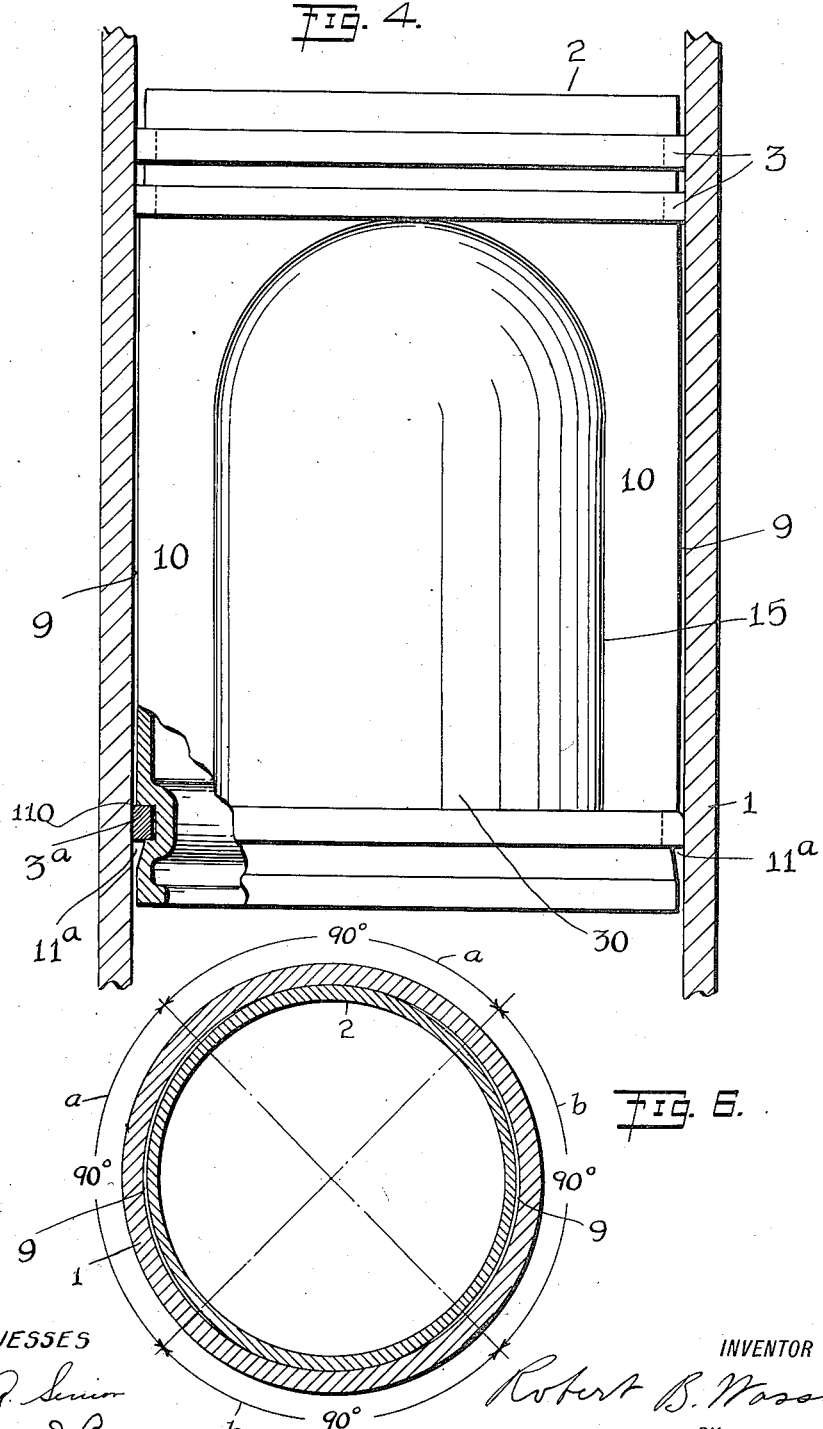

ROBERT B. WASSON, OF CRANFORD, NEW JERSEY.

PISTON.

1,320,188.  Specification of Letters Patent.  Patented Oct. 28, 1919.

Application filed March 7, 1916. Serial No. 82,601.

*To all whom it may concern:*

Be it known that I, ROBERT B. WASSON, a citizen of the United States, residing in Cranford, Union county, State of New Jersey, have invented certain new and useful Improvements in Pistons, of which the following is a specification.

The object of the invention is to improve the construction of the pistons of internal combustion engines so that they may operate more efficiently under working conditions. When the engine is in operation the piston becomes highly heated and expands relatively to the cylinder. For this reason it is necessary to provide clearance between the sides of the piston and the cylinder walls. It is customary to relieve or diminish the diameter of the piston all the way around at the head or end adjacent the combustion chamber so that the clearance is greatest adjacent the combustion space, where the greatest heating is produced, this clearance or space between the cylinder and piston being adequate, else "seizing" may occur if the piston become overheated or the lubrication fail. In gas engines, moreover, the connecting rod is pivoted directly to the piston by means of a wrist pin and the lateral component of thrust which results from the explosion and its reaction upon the connecting rod operates at right angles to the axis of the wrist pin. This forces the segment of the piston in the line of thrust against the cylinder walls substantially along a line of contact. From this action increased wear and other objectionable features result.

In accordance with my invention I form the segments of the side surfaces of the piston lying in the quadrants whose tangents are parallel with the wrist pin axis, with as little clearance as possible and machine them on substantially circular arcs whose radii of curvature are substantially equal to that of the cylinder, so that said segmental portions may slide accurately on the opposing surfaces of the cylinder. The remaining segments, that is to say those which are intersected by the wrist pin axis, I relieve radially or cut back from the said circular contour, so as to afford a relatively large clearance and a lesser curvature of the piston at these regions. The walls of the piston being thin, this permits the piston when heated to expand lengthwise of the wrist-pin axis into the relieved spaces without danger of binding in the cylinder in a direction at right angles thereto. Furthermore, the construction compensates for the distortion of the piston resulting from side thrust, this distortion being in the nature of an elongation of that axis of the piston which coincides with the axis of the wrist pin and a corresponding shortening of the axis at right angles thereto.

In addition to the foregoing, the relieving of the sides of the piston which are intersected by the wrist pin axis may be utilized to afford a space into which the lowermost piston ring may scrape excess lubricant from the walls of the cylinder and from which such lubricant may escape back into the crank case of the engine. As is well understood, it is desirable to limit as far as possible the entrance of oil past the piston into the combustion space, where its presence will cause carbon formation, and piston rings accordingly are provided, not only to preserve compression but also to obstruct this passage of the lubricating oil upward above the piston. The bottom piston ring tends to scrape the oil on the cylinder walls downward on each movement toward the crank case, and this action I make efficient by providing a space for the reception of the oil so removed. To this end, in addition to the clearances at the relieved sides of the piston I preferably form the latter with a circumferential recess immediately below the ring. This recess or annular channel may and preferably does communicate with the clearances at the relieved sides of the piston and may also or alternatively permit the escape of the oil to the crank case by way of ducts leading inward through the piston walls. The annular channel preferably extends completely around the piston.

In the accompanying drawings illustrating the invention in a somewhat diagrammatic and exaggerated manner:

Figure 1 is a diagrammatic view of the piston in its cylinder with the connecting rod and crank shaft, indicating the relieved areas of the piston.

Fig. 2 is a view at right angles to Fig. 1 and on a larger scale, showing a portion of the cylinder in longitudinal section and the piston in elevation with a portion thereof broken away and in section, the clearance being exaggerated.

Fig. 3 is a horizontal section through Fig. 2 indicating the quadrants occupied by the arcuate bearing surfaces and the relieved areas on line X—X of Fig. 2, respectively, the clearances being exaggerated;

Fig. 4 is a sectional elevation, with clearances exaggerated, illustrating a modified form with a ring and groove at the bottom of the piston;

Fig. 5 is a diagrammatic view illustrating the relieving of one quadrant of the piston surface greatly exaggerated; and Fig. 6 is a horizontal section through Fig. 2 on line y—y.

In these views the cylinder wall is designated 1, and the trunk piston 2. The head and body of the piston are integral with each other. 3 are piston rings, of any suitable number and character, seated in grooves 4 adjacent the head of the piston. 5 is the crank shaft, and 6 the connecting rod pivoted on the wrist pin 7, which latter is held in the usual manner in the internal bosses 8 of the piston. The upper portion of the piston, which carries the rings 3 and which becomes the most highly heated because next to the combustion chamber, is preferably relieved or reduced in diameter substantially uniformly throughout its circumference, that is to say, in accordance with usual practice. The lower and major external part of the piston, however, is differentiated, the segments in the quadrants, more or less, designated a in Fig. 3, the tangents of which are parallel with the wrist pin axis, being substantially unrelieved and constituting arcuate working faces adapted for close engagement with the corresponding portions of the cylinder. These are the shaded portions 30 in Figs. 1, 2 and 4. These arcuate working surfaces have a radius of curvature equal to that of the cylinder and are preferably struck from offset centers, the arcuate working surface of one quadrant being struck from one center and that of the other quadrant from another center. The quadrants b, more or less, the tangents of which are perpendicular to the wrist-pin axis, are relieved or cut back from a circular contour to a substantial extent so as to afford clearances. The drawing illustrates a form of relieving wherein the quadrantal surfaces b are curved on arcs having a greater radius of curvature than the quadrantal surfaces a, the clearances 9 thus formed being of elongated crescent shape; but it is to be understood that the particular form of these surfaces and the clearances is not essential, and that the clearances may be made very much wider if desired. The relieved areas are marked 10 in Figs. 1 and 2, where it will be seen that they preferably extend farther around the circumference of the piston toward the end adjacent the combustion chamber than elsewhere. The line 15 indicates the boundary between the relieved and unrelieved portions of the piston.

The lowermost piston ring of Figs. 1 and 2 on the down strokes, that is to say, in its movements toward the crank case and away from the head, scrapes the excess lubricant off from the cylinder walls into the annular recess 11 which acts as a reservoir. The overflow from the recess flows into the crank case along the relieved portions 10 of the piston. The relieved portion communicates with the recess substantially around its entire circumference. As shown in Fig. 2, escape ducts 12 may be formed through the wall of the piston from this reservoir, to permit the oil scraped by the ring to pass into the interior of the piston and thence to the crank case, but the presence of these ducts is not necessarily essential. The head end of the lowermost ring 3 is preferably rounded as indicated at 110 so as to avoid scraping oil along the cylinder wall toward the combustion chamber.

Fig. 4 shows a piston $2^a$ wherein the lowermost piston ring $3^a$ is removed from the head end of the piston to a point adjacent its lower end, the collecting channel $11^a$ being accordingly directly below this ring. Otherwise the construction may be as in Fig. 2, except that the ducts 12, which are unnecessary in this construction are not employed.

While the invention has been described in the terms of an engine having its cylinders vertically disposed, it will be understood that it is not necessarily limited to this arrangement.

What I claim is:

1. An internal combustion engine piston comprising a head and trunk in one piece, the trunk being substantially cylindrical and having the quadrantal portions, approximately, of its sides that are opposite the ends of the wrist-pin axis curved on a slightly lesser degree of curvature than the intervening portions, so as to lie close to the wall of the engine cylinder without excessive bearing thereon under working condition.

2. An internal combustion engine piston comprising a head and trunk in one piece, the head being grooved to receive packing rings and being relieved around the whole circumference, and the trunk being substantially cylindrical and having the quadrantal portions, approximately, of its sides that are opposite the ends of the wristpin axis curved on a slightly lesser degree of curvature than the intervening portions, so as to lie close to the wall of the engine cylinder without excessive bearing thereon under working conditions, the wrist-pin being wholly included within said side portions of slightly lesser curvature.

3. An internal combustion engine piston comprising a head and trunk in one piece, the head being grooved to receive packing rings and being relieved around the whole circumference, and the trunk being substantially cylindrical and having the quadrantal portions, approximately, of its sides that are opposite the ends of the wrist-pin axis relieved and curved on a slightly lesser degree of curvature than the intervening portions, so as to lie close to the wall of the engine cylinder without excessive bearing thereon under working conditions, and the relieved portions of the latter extending farthest around the circumference adjacent the head.

In testimony whereof, I have signed my name to this specification, in the presence or two subscribing witnesses.

ROBERT B. WASSON.

Witnesses:
 R. R. ZIMMER,
 MATTIE A. BUTTERWORTH.